(12) United States Patent
Beyer et al.

(10) Patent No.: US 10,928,808 B2
(45) Date of Patent: Feb. 23, 2021

(54) ENABLING A PROCESSING STEP FOR AN OBJECT TO BE PROCESSED

(71) Applicant: SIEMENS AKTIENGESELLSCHAFT, Munich (DE)

(72) Inventors: Dagmar Beyer, Munich (DE); Markus Heintel, Munich (DE)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 89 days.

(21) Appl. No.: 15/756,126

(22) PCT Filed: Sep. 21, 2015

(86) PCT No.: PCT/EP2015/071589
§ 371 (c)(1),
(2) Date: Feb. 28, 2018

(87) PCT Pub. No.: WO2017/050348
PCT Pub. Date: Mar. 30, 2017

(65) Prior Publication Data
US 2018/0246501 A1 Aug. 30, 2018

(51) Int. Cl.
*G05B 19/418* (2006.01)
*G06F 9/50* (2006.01)
*G06Q 10/06* (2012.01)

(52) U.S. Cl.
CPC ...... *G05B 19/41865* (2013.01); *G06F 9/5011* (2013.01); *G06Q 10/06312* (2013.01); *G05B 2219/32087* (2013.01); *G05B 2219/32117* (2013.01); *G05B 2219/33334* (2013.01); *G06F 2209/503* (2013.01)

(58) Field of Classification Search
None
See application file for complete search history.

(56) References Cited

U.S. PATENT DOCUMENTS

| | | |
|---|---|---|
| 5,980,078 A | 11/1999 | Krivoshein et al. |
| 6,507,950 B1 * | 1/2003 | Tsukidate ........... H04N 21/6547 725/54 |
| 6,647,300 B1 | 11/2003 | Balasubramanian et al. |
| 7,200,564 B2 * | 4/2007 | Eichstaedt ............. G06Q 30/06 705/7.12 |

(Continued)

FOREIGN PATENT DOCUMENTS

| | | |
|---|---|---|
| RU | 2007132082 A | 2/2009 |
| WO | 2017050348 A1 | 3/2017 |

OTHER PUBLICATIONS

PCT International Search Report dated Jun. 2, 2016 corresponding to PCT International Application No. PCT/EP2015/071589 filed Sep. 21, 2015.

(Continued)

*Primary Examiner* — Octavian Rotaru
(74) *Attorney, Agent, or Firm* — Schmeiser, Olsen & Watts LLP

(57) ABSTRACT

Provided is a method and an arrangement for enabling a processing step for an object that is to be processed, wherein an availability result, which indicates an availability of the processing step, is determined for the processing step on the basis of rules.

1 Claim, 2 Drawing Sheets

(56) References Cited

U.S. PATENT DOCUMENTS

| | | | |
|---|---|---|---|
| 7,401,728 B2* | 7/2008 | Markham | G06Q 50/00 |
| | | | 235/375 |
| 8,121,882 B2 | 2/2012 | Zayic | |
| 8,127,063 B2 | 2/2012 | Sherriff et al. | |
| 2002/0046125 A1* | 4/2002 | Speicher | G06Q 40/04 |
| | | | 705/22 |
| 2003/0172008 A1* | 9/2003 | Hage | G06Q 30/02 |
| | | | 705/28 |
| 2006/0080216 A1* | 4/2006 | Hausman | G06Q 40/04 |
| | | | 705/37 |
| 2007/0005410 A1* | 1/2007 | Kasravi | G06F 9/466 |
| | | | 719/318 |
| 2007/0156489 A1 | 7/2007 | Berger | |
| 2007/0156490 A1 | 7/2007 | Bock | |
| 2007/0226025 A1* | 9/2007 | Chang | G06Q 10/06375 |
| | | | 705/7.37 |
| 2008/0300948 A1* | 12/2008 | Boss | G06Q 10/0631 |
| | | | 705/7.12 |
| 2008/0301028 A1* | 12/2008 | Boss | G06Q 40/04 |
| | | | 705/37 |
| 2010/0332306 A1* | 12/2010 | Darveau-Garneau | G06Q 30/0222 |
| | | | 705/14.23 |
| 2011/0251865 A1* | 10/2011 | Yuen | G06Q 10/087 |
| | | | 705/7.11 |
| 2014/0316965 A1* | 10/2014 | Petrisor | G06Q 20/26 |
| | | | 705/37 |
| 2015/0032520 A1* | 1/2015 | Randel | G06Q 30/0212 |
| | | | 705/14.14 |
| 2015/0153725 A1 | 6/2015 | Matheny et al. | |
| 2015/0161640 A1* | 6/2015 | Walling, III | G06Q 30/0222 |
| | | | 705/14.19 |
| 2016/0092988 A1* | 3/2016 | Letourneau | G06Q 20/363 |
| | | | 705/66 |
| 2016/0330034 A1* | 11/2016 | Back | G06Q 20/065 |
| 2016/0358165 A1* | 12/2016 | Maxwell | G06Q 20/0655 |
| 2017/0075838 A1* | 3/2017 | Nooney | H04L 49/1515 |
| 2018/0211718 A1* | 7/2018 | Heath | A01K 29/005 |
| 2018/0246501 A1 | 8/2018 | Beyer et al. | |

OTHER PUBLICATIONS

Non-English Brazilian Office Action dated May 4, 2020 for Application No. BR112018003424-0.

\* cited by examiner

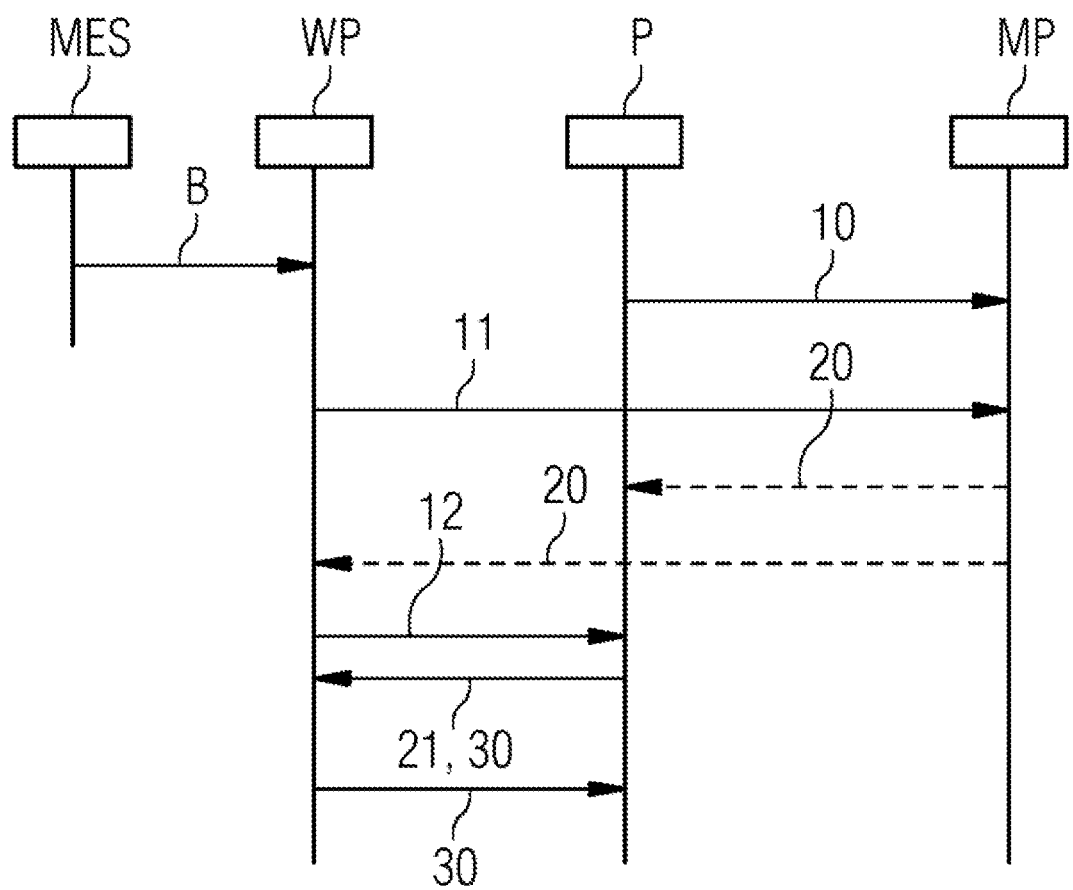

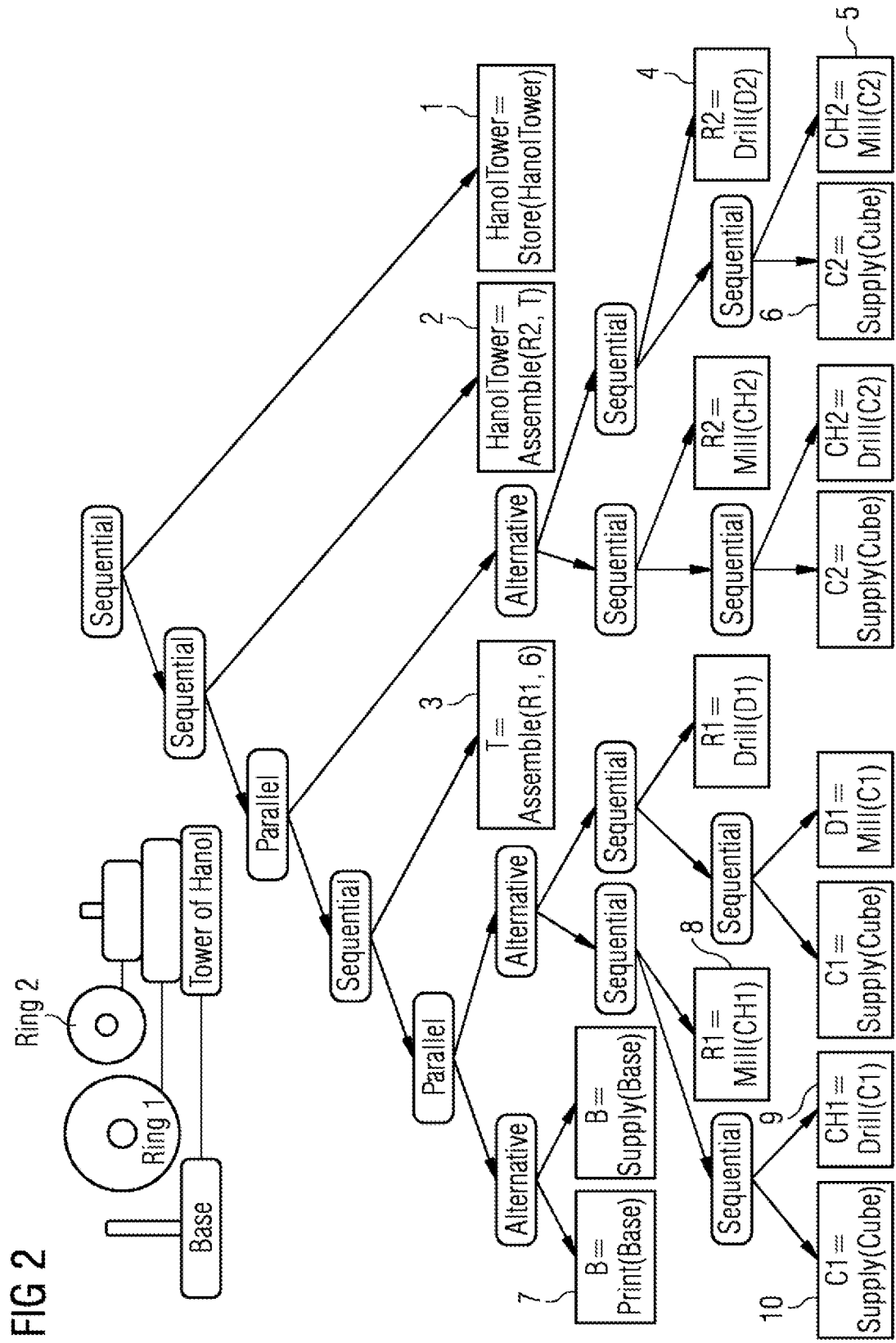

ENABLING A PROCESSING STEP FOR AN OBJECT TO BE PROCESSED

CROSS-REFERENCE TO RELATED APPLICATIONS

This application claims priority to PCT Application No. PCT/EP2015/071589, having a filing date of Sep. 21, 2015, the entire contents of which are hereby incorporated by reference.

FIELD OF TECHNOLOGY

The following relates to a method and an arrangement for enabling a processing step for an object to be processed, an availability result which indicates an availability of the processing step being determined on the basis of bids for the processing step.

BACKGROUND

Flexible, decentralized, self-organizing and workpiece-centered production systems are being increasingly used in automation installations having a multiplicity of production units or manufacturing units or machines and for handling a multiplicity of processing steps. For example, so-called Cyber Physical Production Systems, or CPPS for short, are used. In such systems, the workpiece independently controls its production sequence. For this independent control, it is necessary for production resources, for example the service or the functionality of a manufacturing machine or its assignment for carrying out a processing step in a manufacturing line, including the material or equipment needed to carry out the processing step, to be usefully allocated to the individual workpieces. The resource allocation or resource assignment is therefore driven by the workpiece itself.

In an automation installation having an industrial network which is coupled to an office or IT network, in particular, improper access to resources is intended to be prevented. Resources should be understood as meaning, for example, production services provided by production units, such as robots, conveyor systems, CNC machines etc., or by subordinate production subsystems for a production step, data services or the use of equipment when carrying out production steps by means of production units. A processing step in production requires one or more resources. Access rules which are intended to prevent improper access of individual objects to be processed to resources can be statically defined. Statically defined access rules cannot be used for a scenario such as in a cyber physical production system in which the production sequence is intended to be flexibly controlled by the workpiece itself, possibly taking into account other workpieces or other characteristic variables of the production installation.

For dynamic allocation of access rights to resources, it is generally known to have resource allocation upstream as a result of central production planning and production control. Although certain dynamic assignment and therefore the consideration of conditions or changes in the automation installation are thus possible, this can be carried out only by a central unit which can respectively distribute the resources in advance for a certain period.

Production installations are therefore largely statically planned by the engineering and the sequence of the production steps is permanently predefined by the installation, for example. This is the case with a fixed production line, for example. The production sequence for the individual workpieces may likewise be centrally preplanned, for example by a Manufacturing Execution System, MES for short. For example, the MES configures the individual production units or production units according to the plan. For example, a particular time window for producing a particular workpiece is planned on a milling machine.

SUMMARY

Against this background, the embodiments of the present invention provide an improved and tamperproof method and an arrangement for a decentralized or workpiece-centered production system which enable resource allocation in a production installation.

An aspect relates to a method for enabling a processing step for an object to be processed with an allocated credit, having the following steps of:

determining an availability result by means of a processor, wherein the availability result is determined on the basis of a request from the object to be processed with a bid for the processing step, on the basis of further requests from further objects to be processed for the processing step and on the basis of further bids associated with the further requests and on the basis of an offer from a production unit suitable for carrying out the processing step, wherein the bid is a partial amount of the credit allocated to the object to be processed;

enabling the processing step in the case of a manufacturing step request from the object to be processed in exchange for a reduction in the credit by the bid if the availability result indicates availability.

An object to be processed is understood as meaning, for example, a workpiece or a workpiece carrier or a batch. The object to be processed is processed by the production unit in any desired form. It is therefore an object to be processed or treated. For example, a physical object is treated, for example coated, by a manufacturing unit. Alternatively, a starting material, for example a fluid, is processed, for example heated or compressed, etc. It may also be a workpiece carrier which requests the processing step.

A processing step is understood as meaning, for example, a production step within a sequence of production steps for producing a finished workpiece. For example, the processing step is a treatment of the material of the workpiece or the provision of a product component, for example a screw, for the workpiece. It may likewise be a manufacturing step for treating a workpiece carrier, for example an adaptation of the shape or temperature of a workpiece carrier for a subsequent production step for the workpiece. It is, in particular, a production method for a product. The product may be in the form of a workpiece in the various phases of the manufacturing, treatment or processing process and the workpiece may be, in particular, a starting product, an intermediate product or an end product. The method can likewise be used in process steps in batch production which are carried out by a production unit.

A request from the object to be processed can be understood as meaning, for example, the transmission of a message or information or data from the object to be processed. In particular, an object to be processed has a radio interface to the processor or to an apparatus on which the processor is provided. The bid for the processing step is transmitted via this radio interface, for example. A bid should be understood as meaning an item of information which indicates an amount in any desired currency, in particular a fictitious currency, for example. The object to be processed, for example the workpiece or the workpiece carrier, therefore—in a similar manner to that in to an auction—sets a particular amount in a currency which is consistently and permanently predefined, for example, within the entire automation installation in which the workpiece is treated. The request may also be created by the digital twin of the object to be processed. The digital twin or the digital image of the end product contains, for example, the information relating to the credit available for the entire production process and bids for the processing steps. This is advantageous, in particular, for scenarios in which an object to be processed is not suitable for having an interface on account of the physical configuration. For example, although a transponder or a chip for using near-field communication methods can be readily fitted to a workpiece or a workpiece carrier, this is not possible for a mixture of substances. The request can be advantageously made by means of the digital twin of the object to be processed, in particular for these situations.

The selected currency is a metric, on the basis of which the various bids from the various objects to be processed are related to one another inside a production installation. The credit allocated to the object to be processed is always limiting for the bid, that is to say the bid cannot correspond to a value larger than the entire credit. The credit can be managed by means of a central account. It is also possible to use technologies for decentralized crypto currencies, for example bit coin methods, which simultaneously ensure a reliable transaction.

The availability result is a result of an auction involving the objects to be processed which bid for the processing step. The availability result can therefore indicate availability of the processing step for an object to be processed on the basis of its bid, that is to say can indicate that the bid from the workpiece or workpiece carrier or batch or the digital twin of these objects was sufficiently high in comparison with other available bids from other objects to be processed. A measuring system in which the influence on the auction increases with increasing level of an amount, that is to say of the bid, can be taken as a basis, in particular, as the metric. That is to say, a higher amount outbids a lower amount.

The production unit, whose processing step is being requested, itself provides an offer, in response to which the processing step can be provided. This can be selected to be very low, for example, if the resources for carrying out the processing step are sufficiently available for the production unit. Alternatively, the production unit may already select a very high amount as the offer in order to have a processing step available for objects to be processed which allocate a high priority to the processing step. The availability result can be made available both to the object to be processed and to the production unit, for example. The availability result is transmitted to a workpiece via the radio interface of the workpiece, for example.

If the availability result indicates that there is availability for the object to be processed for the desired processing step, that is to say the bid was sufficient in comparison with the bids from other objects to be processed, the processing step is enabled in the case of a processing step request from the object to be processed. For example, the workpiece directly requests the processing step from the production unit and the production unit grants access to the processing step on the basis of the availability result. For example, the production unit itself has the availability result or receives the availability result from the workpiece together with the processing step request.

In one embodiment, the request with the bid and the processing step request coincide. That is to say, the step which reduces the credit is also simultaneously initiated together with the initiation of the auction step if the auction was successful.

In return for the enabling, the credit of the object to be processed is reduced by the amount of the bid. A bid can always be only a partial amount of the credit allocated to the object to be processed. From a total credit provided for the entire manufacturing process for a workpiece for example, the workpiece can independently use amounts for a respective bid. The total credit available at the outset is therefore the upper limit for the sum of bids which can be delivered.

The object to be processed therefore advantageously independently purchases the required production services. For example, the availability result is determined by means of a processor which is used as a marketplace or auction platform. Instead of stipulated production resources which are firmly provided and allocated in advance for an object to be processed, a fixed credit is therefore allocated to the object to be processed and can be used by the latter for production. This effectively provides an upper limit for the amount of production or manufacturing resources, for example the number of different processing steps or the frequency of processing steps which can be used by an object to be processed. A processing step is paid for by means of the processing step request, in the case of which the available credit is reduced by the bid made and the processing step is enabled in return. The enabling is carried out, for example, by issuing a ticket for using the requested production resource or the processing step.

The production resources which can be allocated at most by an object to be processed are dynamically advantageously limited according to embodiments of the present invention. After each bid from each object to be processed in a production installation, the respectively available credit is adapted, that is to say reduced, for the objects to be processed for which availability is indicated and which request the processing step, and is left unchanged for the objects to be processed whose bid was not sufficient. A security mechanism for the allocation of resources is therefore provided in a dynamic system. Unauthorized access operations, for example denial of service attacks on production resources, can be prevented.

In addition to restricting the resources by allocating a credit for each object to be processed, useful metrics for optimizing the production process are additionally provided by the currency which is used as a basis for pricing by the auction method. Since central control and allocation, for example by an MES, are not possible in decentralized systems, the enabling method presented, with the determination of the availability result over the course of an entire manufacturing process, provides an optimized method which can react flexibly to current offers and bids and moreover increases the security in the event of attacks on individual workpieces or their digital twin. Data relating to a digital twin of a workpiece or of an end product are difficult to protect, in particular in networked automation installations. Since the sensitive data with regard to a production sequence, including an item of information for allocating resources to workpieces or for enabling processing steps, do not have to be present on the digital twin according to the subject matter of the present application, the security is increased.

According to one configuration, an enabling voucher is issued for enabling the processing step, and the enabling voucher can be redeemed by the object to be processed in a predefinable period, in particular at a time later than that of the processing step request.

In particular, an object to be processed can first of all make bids for all processing steps required for a production step and can initially wait for the enabling voucher for all bids before the individual services or steps are used. The enabling voucher is, in particular, a ticket which comprises a data record indicating which processing step has been enabled. The enabling voucher is then submitted to the production unit, for example, by the object to be processed, that is to say is transmitted via the radio interface, for example. The availability of the required resources can therefore be advantageously checked in advance for the object to be processed.

In one variant, the enabling voucher is redeemed directly with the processing step request or directly with the request containing the bid. The processing step is therefore requested by the workpiece virtually without further conditions. If the auction is successful, the processing step is carried out automatically and without further communication between the units. The enabling is then granted by the auction platform and the processing step can be carried out directly by the production unit.

According to one configuration, the credit allocated to the object to be processed restricts the request with the bid by virtue of the partial amount being less than or equal to the amount of credit allocated to the object to be processed. For each bid, it is therefore possible to access only the credit allocated to the object to be processed. In particular, the entire amount of credit can be used for the first bid.

According to one configuration, the credit allocated to the object to be processed is reduced by the bid in the case of enabling and a further request with a further bid is restricted by the reduced credit currently allocated to the object to be processed. The credit available for a bid therefore becomes gradually smaller until it has been completely used up.

According to one configuration, the enabling and the reduction of the credit change memory contents of a memory of the object to be processed. For example, the status in the digital twin or the information relating to the current credit in a transponder or RFID tag changes. For example, the memory stores the currently allocated credit which changes, namely is reduced, over the course of a manufacturing process.

According to one configuration, the credit is allocated by a production control system. A production control system is, in particular, an MES. Only the credit of the object to be processed is planned centrally and in advance. In particular, the credit is allocated by the production control system to each object to be processed within a production installation. Priorities can therefore be allocated by the production control system. The credit can advantageously no longer be changed by the workpiece. It is possible to provide, for example, a memory which prevents the storage of a higher value for the remaining credit after a processing step request than the value before the request, for example a monotonous counter.

According to one configuration, a plurality of partial processing steps are enabled by enabling the processing step. For example, a request or a bid may simultaneously comprise a plurality of substeps in a manufacturing process. In particular, for operations inside a production method which are intended to follow in close temporal succession, for example on account of environmental conditions required for a step, enabling should be possible only in a block.

According to one configuration, the enabling and the issuing of the enabling voucher are carried out autonomously by a control unit or by a control unit and the production unit. The availability result is advantageously processed directly by a control unit, that is to say the availability result is transmitted to components of the production installation in the form of a message, for example. The enabling is carried out autonomously and, in particular, without human intervention in the method directly on the basis of the availability result. The enabling can likewise be directly carried out by the control unit or by a production unit to which the availability result is available.

According to one configuration, the enabling voucher is issued in a cryptographically secured manner. There is interest in ensuring the authenticity of the enabling voucher so that the production unit can rule out manipulation of the workpiece. For example, the enabling voucher is secured by means of a cryptographic method, for example a digital signature method.

According to one configuration, the request is transmitted to a control unit and/or to the production unit by means of an interface of the object to be processed, in particular by means of a radio interface.

The following also relates to a computer program product (non-transitory computer readable storage medium having instructions, which when executed by a processor, perform actions) having a computer program which has means for carrying out the method according to one of the configurations mentioned above when the computer program is executed on a program-controlled device. A computer program product, for example a computer program means, can be provided or delivered, for example, as a storage medium, for example a memory card, a USB stick, a CD-ROM, a DVD, or else in the form of a downloadable file from a server in a network. This can be carried out, for example, in a wireless communication network by transmitting a corresponding file containing the computer program product or the computer program means. A control device, for example a microprocessor for a smart card or the like, is possible, in particular, as a program-controlled device.

The following also relates to an arrangement for enabling a processing step for an object to be processed, having:

a control unit for determining an availability result, wherein the availability result can be determined on the basis of a request from the object to be processed with a bid for the processing step, on the basis of further requests from further objects to be processed for the processing step and on the basis of further bids associated with the further requests and on the basis of an offer from a production unit for carrying out the processing step, wherein the bid is a partial amount of the credit allocated to the object to be processed;

an enabling unit having an interface to the object to be processed for enabling the processing step in the case of a processing step request from the object to be processed in exchange for a reduction in the credit by the bid if the availability result indicates availability.

According to one configuration, the enabling unit is integrated in the control unit or is externally provided as part of the production unit. For example, it is possible to provide a central control unit which is responsible both for allocating the credit and for receiving the bids and offers and determining the availability result as well as for issuing the enabling voucher. In this scenario, the object to be processed communicates directly with the central control unit. Alternatively, the enabling unit is provided as part of a production unit of a production installation in a decentralized solution. The control unit is then assumed by any desired component of the components of the production installation, for example. The other components then trust this component. The control unit may likewise be in the form of a processor which is provided in a cloud. In such a scenario, a workpiece communicates with a cloud server and the cloud server determines the availability result. For example, the cloud server also communicates with the production units which issue the enabling voucher in the case of a processing step request from an object to be processed on the basis of the availability result.

According to one development, the control unit is part of a cloud system or a dedicated system or is formed by a head computer or by one of a plurality of production units of a production installation.

BRIEF DESCRIPTION

Some of the embodiments will be described in detail, with references to the following Figures, wherein like designations denote like members, wherein:

FIG. 1 shows a flowchart for schematically illustrating a method for enabling a processing step according to a first exemplary embodiment of the invention; and FIG. 2 shows a schematic illustration of a process on the basis of a production process graph for illustrating an auction method according to a second exemplary embodiment of the invention.

DETAILED DESCRIPTION

FIG. 1 shows how a processing step is enabled for an object WP to be processed by a production unit P. For this purpose, the workpiece WP transmits a request 11 to a marketplace MP. The marketplace MP is an auction platform which receives requests with bids from various workpieces inside a production installation or manufacturing installation and compares them both with one another and with an offer 10 from the production unit P. The calculations which are needed for the functionality of the marketplace MP are carried out by a processor.

For example, a manufacturing line is provided, through which the workpiece WP runs, for example for finishing purposes. For this purpose, the workpiece WP must request processing steps from various production units, in particular from the production unit P. The workpiece WP receives a credit or budget B for this from a manufacturing execution system MES.

In particular, a production sequence is centrally preplanned for the workpiece WP by the MES with regard to the steps to be run through. The MES transmits the intended production steps to the workpiece WP. However, there is no provision for the MES to configure the production units and, in particular, the production unit P. In particular, the plan does not provide any time windows which are assigned to the individual workpieces for individual steps. Instead, the availability of production steps for a workpiece is intended to be negotiated between the manufacturing components in a decentralized manner in a workpiece-centered production system. The MES predefines only a total budget or credit B with which the workpiece WP must manage for its entire production inside the production installation or for a production substep. The manufacturing plan and the allocated credit B are either stored on the workpiece WP, that is to say in a memory on the workpiece WP, or the workpiece retrieves this information itself from a cloud service or from a central control computer.

The auction method and the process of determining an availability result 20 are carried out by the processor. In this case, the processor can access cloud services, for example in order to retrieve or store requests from the workpieces, offers from the production units or availability results for various workpieces or various, temporally successive requests from a workpiece.

The processor may be part of a programmable logic controller which is provided in the production installation for the purpose of controlling or regulating one or more production units. Since the processor carries out the functionality of the auction platform, it is a necessary prerequisite for all production units and workpieces involved to be able to trust the processor. In a scenario in which the marketplace MP is formed by one of the production units in the production installation, manipulation protection of the production unit with the marketplace functionality should be especially ensured.

The requested service or production step is paid for by the workpiece WP after a successful bid, that is to say provided that the availability result 20 indicates availability. For example, a message containing a data record from the production unit P to the workpiece WP contains a flag which signals the "OK" of the marketplace. Otherwise, the flag signals that a bid was too low or an offer from a production installation was not available and an auction was therefore unsuccessful. Alternatively, it is possible to dispense with this message, with the result that the failed auction is indicated by a failure to receive an availability result. The payment is effected by transmitting a processing step request 12 to the production unit P. The credit B of the workpiece WP is now reduced and the corresponding memory entry in the workpiece memory, cloud server or control computer is updated. In return, the workpiece WP receives an enabling voucher 30 or a ticket for using the service of the production unit P, which voucher is transmitted by the workpiece WP to the production unit P during use.

FIG. 2 illustrates the production of a product "Tower of Hanoi", consisting of a base, ring 1 and 2, on the basis of a production process graph. The graph illustrates processing steps which are to be handled and are carried out either in succession, in a parallel manner or alternately to one another. For example, a budget of 30 is predefined at the root node and therefore for the entire production process. The amount 30 may be an amount in any desired stipulated currency. A consistent currency should be heeded only within a production installation. Otherwise, correct performance of the auction is not ensured. The credit for each object to be processed is managed by means of a central account.

In a first auction, a price of 1 results for the operation "Store Hanoi Tower". For example, the first bid for the processing step "Store Hanoi Tower" 1 was directly the value 1 or a first request contained a lower bid which was not sufficient for issuing an enabling voucher and a second request was transmitted with the higher value 1 and was successful. The remaining budget of 29 can be used at most in the next auction. A price of 3 results for the subsequent step "Assemble (R2, T)" 2 in the auction. The following table lists further bids which result in an enabling voucher for the associated processing steps 3-10.

T=Assemble (R1, B):2
R2=Drill (D2):1
D2=Mill (C2):2
C2=Supply (Cube):4
B=Print (Base):7
R1=Mill (CH1):2
CH1=Drill (C1):1
C1=Supply (Cube):5
Remaining budget:2

A remaining credit remains, for example, after all steps for producing the Tower of Hanoi have been carried out. A bid is individually made for each step, such as the drilling or milling of individual components of the "Tower of Hanoi". Since the credit of the end product "Tower of Hanoi" is limited, only a limited quantity of production services can be allocated. In workpiece-centered production control, this limits the possibilities of an attacker who is able to manipulate the workpiece or its virtual image or individual components of the end product. In particular, an attack on a virtual image is relatively easily possible in scenarios in which the virtual image or a so-called digital twin is accessible via an IT communication network. Although manipulation by modifying a production sequence stored on the digital twin may be possible in the case of a credit with a permanently predefined upper limit, it prevents a denial of service attack on production resources inside a production installation, for example.

Moreover, the currency constitutes the basis for pricing by the auction method and, in addition to the resource restriction used as a security mechanism, also provides a useful metric for optimizing the production process. In particular, the sequence in which various workpieces can use a service is matched to one another and is optimized with respect to waiting times or utilization of the machines.

Although the invention has been illustrated and described in greater detail with reference to the preferred exemplary embodiment, the invention is not limited to the examples disclosed, and further variations can be inferred by a person skilled in the art, without departing from the scope of protection of the invention.

For the sake of clarity, it is to be understood that the use of "a" or "an" throughout this application does not exclude a plurality, and "comprising" does not exclude other steps or elements.

The invention claimed is:

1. A method for controlling a manufacturing process comprising:
    coating, by a manufacturing unit, a material on a workpiece;
    treating, by the manufacturing unit, the workpiece for adaptation of a shape and temperature of the workpiece for a subsequent manufacturing step to be enabled on the workpiece, wherein the coating and treating are initial steps within the manufacturing process;
    fitting a transponder to a portion of the workpiece which is not a mixture of substances, in order to communicate information relating to the manufacturing process;
    creating a digital twin image for another portion of the workpiece that is a mixture of substances, wherein the digital twin image contains respective bids for prioritizing among all manufacturing steps and an allocated credit for controlling the manufacturing process;
    receiving, at the manufacturing unit, a bid among competing bids, requesting availability of performing the subsequent manufacturing step among competing manufacturing steps and simultaneously reducing the allocated credit by the amount of the bid upon successful processing of the bid;
    issuing, by a control unit via a radio interface, a voucher indicating the subsequent manufacturing step has been enabled;
    encrypting the voucher by a digital signature in order to ensure authenticity;
    redeeming the voucher directly with the subsequent manufacturing step and automatically performing the subsequent manufacturing step without further communication between the manufacturing unit and the control unit;
    changing the prioritizing among the manufacturing steps according to the reduction in the allocated credit and the issuing of the voucher.

* * * * *